United States Patent [19]

Hubert

[11] Patent Number: 5,685,207

[45] Date of Patent: Nov. 11, 1997

[54] MULTI-PURPOSE WRENCH TOOL

[75] Inventor: Ray Hubert, Kankakee, Ill.

[73] Assignee: Pro Patch Systems, Inc., Palatine, Ill.

[21] Appl. No.: 586,121

[22] Filed: Jan. 16, 1996

Related U.S. Application Data

[63] Continuation-in-part of Ser. No. 273,686, Jul. 12, 1994, abandoned.

[51] Int. Cl.⁶ .................................................. B25B 23/16
[52] U.S. Cl. ................................................. 81/177.5; 7/100
[58] Field of Search ......................... 7/100; 81/124.4, 81/177.5, 177.85

[56] References Cited

U.S. PATENT DOCUMENTS

| | | | |
|---|---|---|---|
| 687,947 | 12/1901 | Weston | 81/124.4 |
| 1,413,698 | 4/1922 | Adams . | |
| 1,683,384 | 9/1928 | Durham et al. . | |
| 1,741,969 | 12/1929 | Bellows . | |
| 2,463,138 | 3/1949 | Bamberg . | |
| 2,549,910 | 4/1951 | Lane . | |
| 3,361,170 | 1/1968 | Hilton . | |
| 3,416,394 | 12/1968 | Hanson . | |
| 4,291,425 | 9/1981 | Sweitzer | 81/124.4 X |

FOREIGN PATENT DOCUMENTS

| | | | |
|---|---|---|---|
| 502169 | 5/1954 | Canada | 7/100 |
| 827924 | 1/1952 | Germany | 7/100 |
| 558801 | 1/1944 | United Kingdom | 81/124.4 |

*Primary Examiner*—James G. Smith
*Attorney, Agent, or Firm*—Baker & McKenzie

[57] ABSTRACT

An improved, two-piece multipurpose wrench tool which offers the strength of a standard four-way lug wrench, the flexibility of an adjustable socket set, and the compact storage ability of a straight, single-piece tool. An elongated leverage bar is inserted through a bore of a main wrench shaft member whereby a thimble-shaped section of the leverage bar becomes securely wedged within the similarly sized and shaped interior surface of the bore. The main wrench shaft member has a standard automobile lug nut socket on one end and a male socket adaptor on the other. Such male socket adaptor is capable of receiving the female attachment end of sockets having a variety of sizes. During operation, the leverage bar is used to provide the torque necessary to either tighten or loosen nuts or bolts. The leverage bar of the present invention also has a standard screwdriver head formed at one of its ends to allow for miscellaneous screwdriving applications and the convenient removal of hub caps and tires.

9 Claims, 2 Drawing Sheets

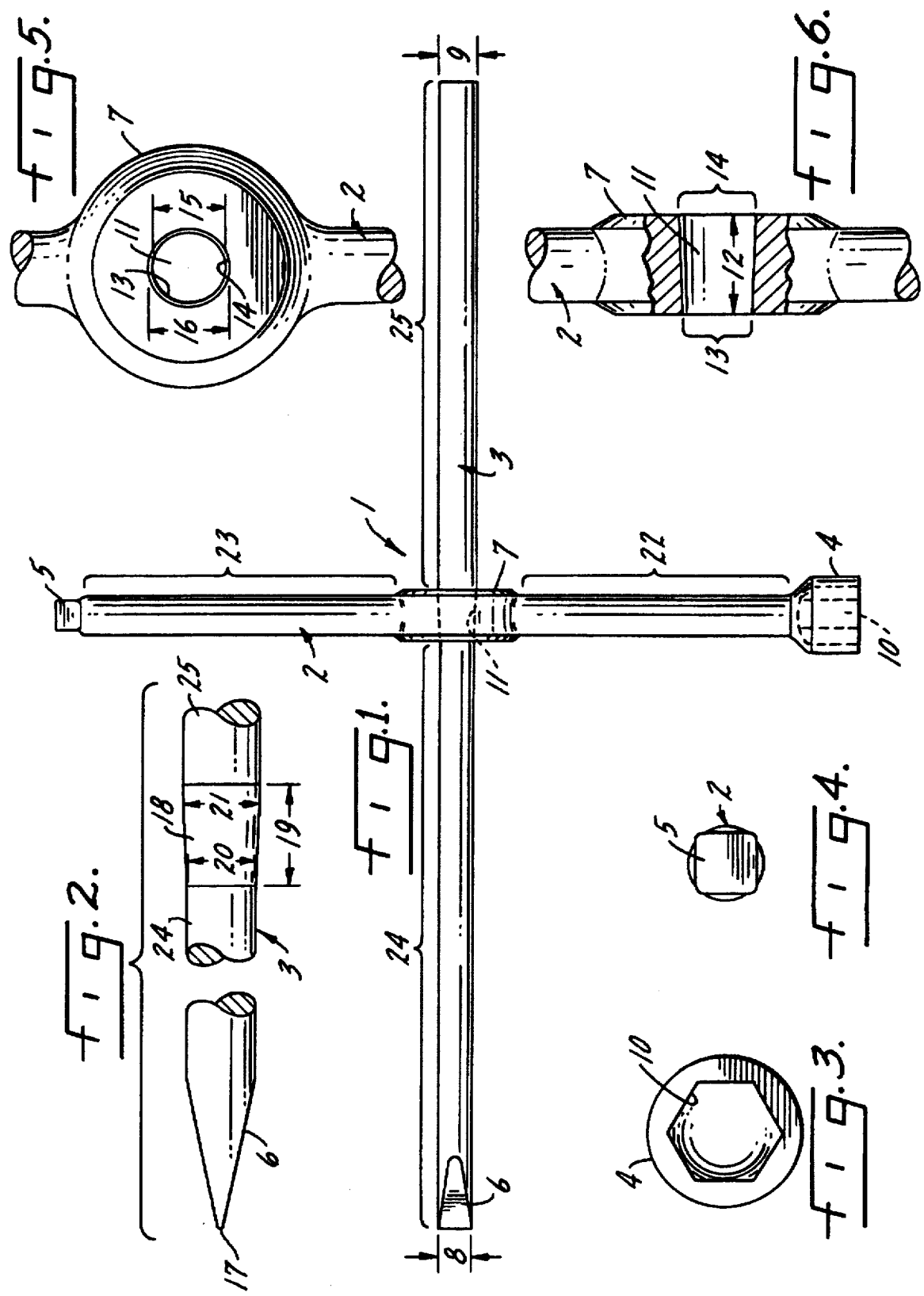

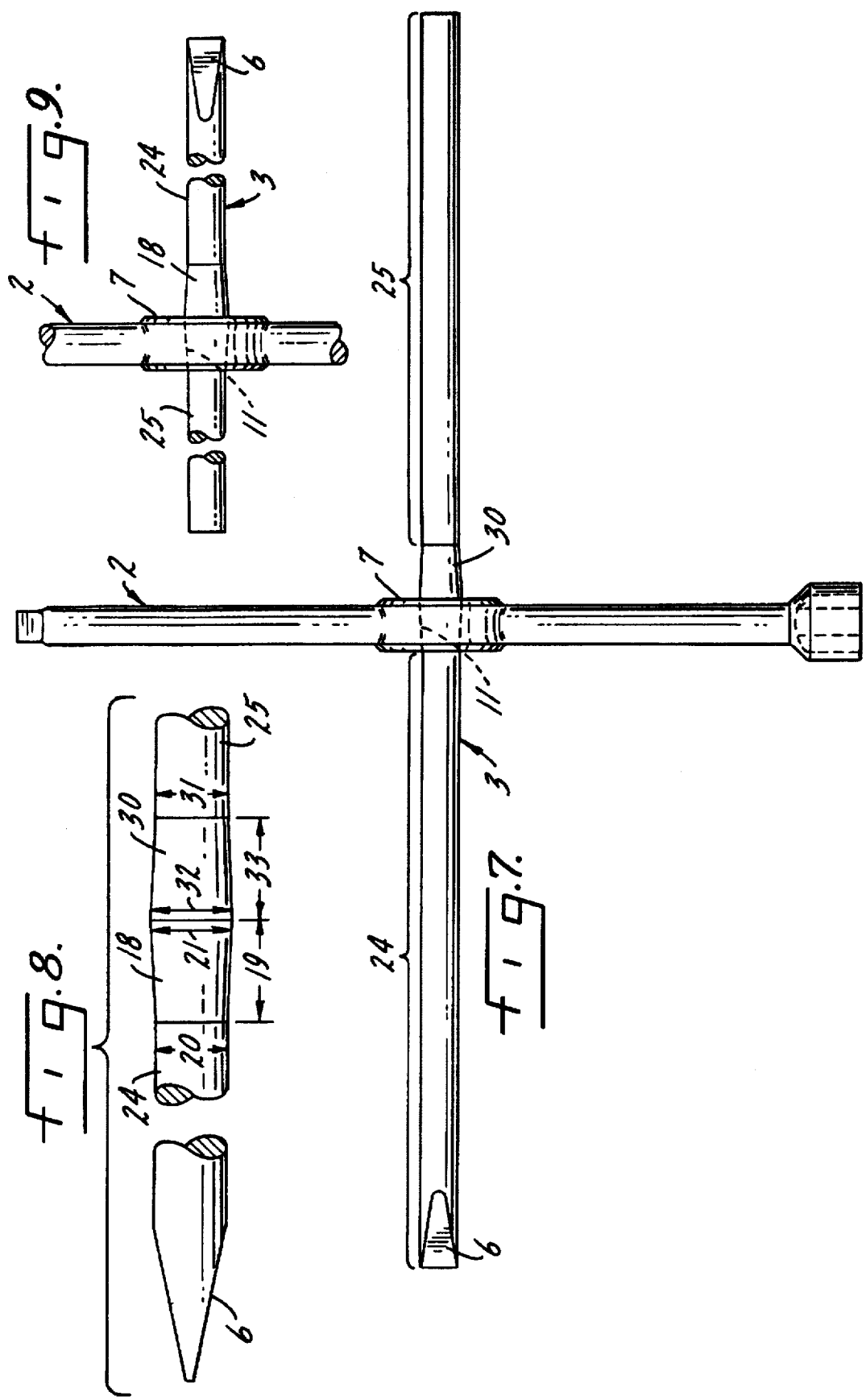

MULTI-PURPOSE WRENCH TOOL

This patent application is a continuation-in-part of U.S. patent application Ser. No. 08/273,686, filed on Jul. 12, 1994 abandoned.

The present invention relates generally to socket and lug wrenches and, more specifically, to inexpensive wrench assemblies that incorporate detachable leverage bars which afford the operator considerable leverage when using the tool.

BACKGROUND OF THE INVENTION

It is commonly known within this field of art that a hand wrench tool which incorporates a perpendicularly attached leverage handle allows the user a good deal more leverage in loosening or tightening nuts, and other associated fastening devices. Indeed, it was based upon this fundamental principle that the standard four-way automotive tire iron became the stock hand tool for vehicle wheel removal and attachment.

This torque-increasing design has been implemented not only in tire iron applications, but also in a variety of other wrench tool designs. Most of these devices include a wrench tool and a cross bar which are connected in either a cross or a T-shape. However, the currently available devices often require complicated, spring-loaded bearing designs to help secure the cross bar. In addition, many of these devices include complex socket assemblies having intricate adjustment mechanisms. Furthermore, many of the wrench tools in the prior art are comprised of three or more pieces and serve only to accommodate a standard automobile lug nut.

Wrench tools which fall into the categories described above are disclosed in U.S. Pat. Nos. 1,413,698; 1,741,969; 1,683,384; 2,463,138; 2,549,910; 3,361,170; and 3,416,395.

In light of the complexities, costs and/or limitations associated with the wrench tool systems which currently exist, what is still needed in this field of art is an extremely simple, inexpensive, yet rugged multi-purpose wrench tool which incorporates an easily attachable and detachable leverage bar. Such multi-purpose wrench tool should provide the strength and durability of a standard four-way lug wrench, the functionality of a multi-sized socket set, and the ability to be conveniently stored as any other single, one-piece tool.

SUMMARY OF THE INVENTION

Accordingly, the multi-purpose wrench tool of the present invention is of a simple, two-piece forged steel design whereby a leverage bar may be quickly attached to a wrench member to function as both a four-way lug wrench and a multi-purpose socket wrench. Indeed, the system disclosed is made of two, inexpensive forged components which can be disassembled and stored in a relatively convenient manner in a matter of seconds.

The basic components of the present invention include a main socket wrench member and an elongated leverage bar. The wrench member has a bore into which the leverage bar may be inserted and secured, resulting in a cross configuration much like a standard four-way tire iron. By virtue of these components' physical dimensions, the leverage bar is simply wedged into place without the need for any complex attachment mechanism.

The socket wrench of the present invention includes a standard automobile lug nut socket on one end and a male socket adaptor on the other. This adaptor is designed to accept a variety of standard sockets having different sizes and shapes. Both the lug nut socket and the adaptor are integrally formed within the forged steel body of the wrench. At an approximate midpoint along the length of this wrench is a transversely-positioned bore. Such bore is physically designed to allow the associated leverage bar to be passed approximately one-half of the way through it.

Affixation of the leverage bar to the wrench tool is accomplished by simply inserting the leverage bar into the bore and, with a minor amount of force, wedging it into place. The smaller end of this leverage bar is also provided with an integrally-formed standard screwdriver head for hubcap removal purposes and other miscellaneous screwdriving applications.

The present invention, in its assembled form, affords its user both the torquing capacity of a standard four-way lug wrench and the flexibility of an adjustable socket wrench. Its rugged, sectional design provides a cost effective tool that can be easily stored within the trunk of a car, but which also has a variety of non-automotive applications.

It is therefore a general object of the present invention to provide a simple, two-piece wrench tool which is very easily assembled and disassembled.

In addition, it is an object of the present invention to provide a two-piece wrench tool which is extremely rugged, yet relatively inexpensive to manufacture.

Another object of the present invention is to provide a wrench tool which, in its assembled state, affords the high torquing capacity of a standard four-way tire iron.

Moreover, an additional object of the present invention is to offer the capability of using the wrench tool in a variety of screwdriving and adjustable socket applications.

A related object of the present invention is to provide a tool which, by its detachable design, is easy to disassemble and store in a very compact/convenient manner.

Further objects and advantages of the invention will become apparent to those of ordinary skill in the pertinent art upon review of the following detailed description, accompanying drawing, and appended claims.

BRIEF DESCRIPTION OF THE DRAWING

FIG. 1 is a perspective view of the multipurpose wrench tool in its assembled position, whereby the leverage bar is inserted and secured to the main shaft of the wrench.

FIG. 2 is an end view of the lug nut socket which is integrally formed into a first end of the main shaft of the wrench.

FIG. 3 is an end view of the male socket adaptor which is integrally formed into a second end of the main shaft of the wrench.

FIG. 4 is an exploded, cross sectional view of the central torquing section in the main wrench shaft of the preferred embodiment of the present invention.

FIG. 5 is a side sectional view of the central torquing section of the main wrench shaft and offers an end view of the wrench's bore.

FIG. 6 is a side elevational view, with portions removed, of the leverage bar of the preferred embodiment and provides an exploded view of both the screwdriver tip and the narrowing middle section of this leverage bar.

FIG. 7 is a perspective view of the multipurpose wrench tool in its assembled position, showing an alternative embodiment which includes a reversible leverage bar.

FIG. 8 is a side elevational view, with portions removed, of the reversible leverage bar of the alternative embodiment.

FIG. 9 is a detailed perspective view of the multipurpose wrench tool in its assembled position whereby the reversible leverage bar of the alternative embodiment is inserted into the main shaft member in a reverse manner.

Notice must be taken that the drawings are not necessarily to scale and that the embodiments are sometimes illustrated by phantom lines and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING

Turning first to FIG. 1, there is shown generally at 1 a perspective view of the multipurpose wrench tool in its assembled position. In accordance with the preferred embodiment, the multipurpose wrench tool I is comprised of simply two pieces; the main shaft member 2 and the leverage bar 3. Both the main shaft member 2 and the leverage bar 3 are of a unibody, forged steel construction. Integrally formed at a first end of the main shaft member, indicated generally at 22, is a standard automobile lug nut socket 4. The interior hexagonal cavity 10 of the lug nut socket 4, denoted by the dashed lines in FIG. 1, is capable of securely receiving a standard automobile lug nut. Integrally formed on the second end of the main shaft member, generally indicated at 23, is a male socket adaptor 5. This male socket adaptor 5 is designed to receive the female connecter end of a standard socket. The versatility of the multipurpose wrench tool 1 is enhanced through its ability to accommodate various sized sockets via the male socket adaptor 5.

At an approximate midpoint along the main shaft member 2 is the central torquing section 7 at which point the majority of force is exerted when the multipurpose wrench tool 1 is being used. This central torquing section 7 has a transversely positioned bore 11 formed therethrough. It is through this transversely positioned bore 11 that the leverage bar 3 is inserted and ultimately secured at an approximate right angle to the main shaft member 2.

The leverage bar 3 has a first end, indicated generally at 24, having a substantially uniform and non-tapering smaller diameter 8 which is able to pass through the transversely positioned bore 11. The leverage bar 3 also has a second end, indicated generally at 25, having a substantially uniform and non-tapering larger diameter 9 that is physically unable to be passed through the transversely positioned bore 11. As noted in FIG. 1, the leverage bar 3 also has a standard screwdriver head 6 which is integrally formed within the first end, indicated generally at 24. When the leverage bar 3 is unattached to the main shaft member 2, the screwdriver head 6 may be used for any number of standard screwdriving applications or for the attachment and removal of hub caps and tires.

Referring now to FIG. 2, an enlarged end view of the standard automobile lug nut socket 4 is illustrated. The forged steel body of this lug nut socket 4 is merely an extension of the body of the main shaft member 2 as indicated back in FIG. 1. FIG. 2 details the internal shape of the lug nut socket 4 as having a hexagonal cavity 10 with sufficient depth to securely accommodate a standard automobile lug nut.

FIG. 3 presents an enlarged end view of the standard male socket adaptor 5. This sectional view of male socket adaptor 5 exemplifies its substantially square shape. Such dimensions correspond to the typically square shape of a female connector on a standard detachable socket. It should be noted that the male socket adaptor 5 is merely a squared off extension of the main shaft member 2 as indicated back in FIG. 1. The design of the male socket adaptor 5 does not incorporate any springs or ball bearings for its proper application. Rather, the male socket adaptor 5 simply relies on a snug fit with the female connector of the associated detachable socket.

Turning now to FIG. 4, what is shown is an exploded view of the central torquing section 7 of the main shaft member 2, with portions removed. This cut away view allows one to observe the details of the transversely positioned bore 11 within the central torquing section 7. The bore 11 can be characterized as having a particular length 12, a smaller bore opening 13, and a larger bore opening 14. As a result of these dimensions, the bore 11 is not perfectly tubular or cylindrical in shape. Rather, by virtue of having a smaller bore opening 13 as well as a larger bore opening 14 the bore 11 takes on a thimble shape with a pre-determined slope. The purpose of these physical dimensions is to ensure that the leverage bar 3 becomes sufficiently wedged in place when inserted into the transversely positioned bore 11.

FIG. 5 is a detailed side view of the central torquing section 7 of the main shaft member 2. In accordance with the preferred embodiment of the present invention, the central torquing section 7 is slightly enlarged with respect to the diameter of the main shaft member 2. This additional mass is provided to simply strengthen the main shaft member 2 at the point where the greatest amount of force is to be applied. It can be appreciated from this schematic that the transversely positioned bore 11 located at the approximate center of the central torquing section 7 has both a smaller diameter 15 associated with the smaller bore opening 13 and a larger diameter 16 associated with the larger bore opening 14, and that the difference between such diameters is minute.

Looking now to FIG. 6, a sectional view of the leverage bar 3 is shown which specifically emphasizes the standard screwdriver head 6 and the narrowing middle section 18. The screwdriver head 6 is neatly formed at the first end 24 of the leverage bar 3 and is narrowly tapered down to a screwdriver tip 17. This screwdriver tip 17 remains extremely strong as it is part of the forged steel form of the leverage bar 3. As such, it is useful not only for all types of normal screwdriver applications, but also for hub cab removal, tire removal and situations requiring the use of a crow bar.

The narrowing middle section 18 of the leverage bar 3, as shown in FIG. 6, has a substantially identical thimble-shape as the internal dimensions of the transversely positioned bore 11 detailed in FIG. 4. Specifically, the narrowing middle section 18 has a particular length 19 which is substantially equal to the bore length 12. In addition, the smaller diameter end 20 of the narrowing middle section 18 is approximately equal to the diameter of the smaller bore opening 13 of the bore 11. Similarly, the larger diameter 21 of the narrowing middle section 18 is approximately equal to the diameter of the larger bore opening 14. These relatively minor differences in diameters allow the narrowing middle section 18 of the leverage bar 3 to become securely wedged within the transversely positioned bore 11.

Referring to FIGS. 1 and 6 together and recalling that both the first end 24 and the second end 25 of the leverage bar 3 have substantially uniform and non-tapering diameters (although possibly different from each other), the narrowing middle section 18 is likely to remain firmly positioned within the bore 11 of the main shaft member 2. That is, since the second end 25 does not have a gradually increasing diameter like the narrowing middle section 18, the leverage bar 3 does not have the potential to be continually wedged further into the bore 11 so as to allow the leverage bar 3 to become jammed or to allow the bore 11 to be forced out of shape.

By simply manufacturing both the main shaft member 2 and leverage bar 3 to the specific dimensions described above, secure and accurate engagement of the two pieces may be accomplished without the need for any undue force, and without the use of any additional fasteners or complex connection scheme.

FIG 7. offers an alternative embodiment of the present invention wherein the leverage bar 3 includes a second narrowing middle section 30 which is integrally formed between the first narrowing middle section 18 and the bar's second end 25. This second narrowing middle section 30 is a mirror image of the narrowing middle section 18 and has a similar shape. If the diameters of the respective non-tapering sections were designed to be different from each other, the lengths of the thimble-shaped sections would need to also be different. This alternative embodiment allows either the first end 24 or the second end 25 to be inserted through the bore 11 of the main shaft member 2 so that the narrowing middle section 18 or the second narrowing middle section 30 may be secured therein, respectively.

Referring now to FIG. 8, it can be seen that the second narrowing middle section 30 of the leverage bar 3 has a substantially identical thimble-shape as the first narrowing middle section 18. Specifically, the second narrowing middle section 30 has a particular length 33 which is substantially equal to the length 19. In addition, the smaller diameter end 31 of the second narrowing middle section 30 is approximately equal to the smaller diameter end 20. Similarly, the larger diameter end 32 of the second narrowing middle section 30 is approximately equal to the larger diameter end 21. Accordingly, the second narrowing middle section 30 of the leverage bar 3 is able to become securely wedged within the transversely positioned bore 11, much the same as narrowing middle section 18.

Turning now to FIG. 9, an assembled view of the alternative embodiment of the present invention is shown, with portions removed, wherein the second end 25 of leverage bar 3 is inserted through bore 11 and second narrowing middle section 30 is secured therein. This alternative embodiment offers the user of the wrench tool 1 the simple flexibility of being able to assemble the device without regard to which end of the leverage bar 3 is inserted into the bore 11 first.

It should be understood that the above described embodiment is intended to illustrate, rather than limit, the invention and that numerous modifications could be made thereto without departing from the scope of the invention as defined by the appended claims. Clearly, not all of the components shown in the drawing are essential to the overall operation of the multipurpose wrench tool. For example, the standard screwdriver head 6 of the leverage bar 3 and the male socket adaptor 5 of the main shaft member 2 could be omitted without affecting the basic torquing function associated with the automobile lug nut socket 4. Similarly, the screwdriver head 6 could just as easily be formed at the second end 25 of the leverage bar 3 or the second end 23 of the main shaft member 2.

On the other hand, the multipurpose wrench tool 1 could be readily modified to include additional components and features as well. For example, the ends of both the main shaft member 2 and the leverage bar 3 could be adapted to accommodate various other tool tips such as a phillips head screwdriver, a small hammer head, a standard crow bar, an allen wrench, etc.

Similarly, it is within the contemplation of the present invention that the specific physical dimensions of both the main shaft member 2 and leverage bar 3 could be slightly modified, while still retaining the ability to be interconnectively wedged together. Indeed, the leverage bar 3 and, more specifically, the narrowing middle section 18 (or Sections 18 and 30 in the double thimble embodiment) could have either a square or triangular shape whereby they would be wedged into position within a corresponding square or triangularly shaped bore 11 of the main shaft member 2. Similarly, while the various thimble-shaped and internal bore surfaces have a straight taper as shown in the figures, a taper other than constant could also be employed. Also within the scope of this invention would be a system incorporating notches, screw threads, or tongue and grooves wherein the leverage bar 3 may be secured to the main shaft member 2 to an even higher degree.

While the present invention has been illustrated in some detail according to the preferred embodiment shown in the foregoing drawing and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

I claim:

1. A multipurpose wrench tool, comprising:
    (a) an elongated shaft member having both a first end and a second end, said first end including an integrally-formed standard lug nut socket, said shaft member further having an enlarged middle section located at an approximate midpoint along said shaft member, said middle section including a transversely positioned cylindrical bore formed therethrough, said bore having a tapering diameter and a thimble-shaped interior surface; and
    (b) an elongated leverage bar insertable into said bore of said shaft member, said leverage bar including a thimble-shaped section located at an approximate midpoint on said leverage bar integrally-formed between a thick end and a thin end, said thick end having a substantially uniform and non-tapering diameter which is slightly greater than a substantially uniform and non-tapering diameter of said thin end, said thimble-shaped section being approximately the same size and shape as said thimble-shaped interior surface of said bore such that said thimble-shaped section is wedged into engaging position with said thimble-shaped interior surface upon said leverage bar being inserted into said bore.

2. The multipurpose wrench tool of claim 1, wherein said thin end further includes a standard screwdriver head integrally-formed therein.

3. The multipurpose wrench tool of claim 2, wherein said second end further includes a standard male socket adaptor integrally-formed therein.

4. A multipurpose wrench tool, comprising:
    (a) an elongated shaft member having both a first end and a second end, said first end including an integrally-formed standard lug nut socket, said shaft member further having an enlarged middle section located at an approximate midpoint along said shaft member, said middle section including a transversely positioned cylindrical bore formed therethrough, said bore having a tapering diameter and a thimble-shaped interior surface; and (b) an elongated leverage bar insertable into said bore of said shaft member, said leverage bar including first and second thimble-shaped sections, said thimble-shaped sections being of substantially similar slope and being positioned such that the thimble-shaped sections slope away from one another, said thimble-shaped sections located at an approximate midpoint on said leverage bar between a primary end and a secondary end, each of said primary end and said secondary end having a substantially uniform and non-tapering diameter, each of said thimble-shaped sections having a shape similar in slope to said thimble-shaped interior surface of said bore such that one or the other of said thimble-shaped sections may be wedged into engaging position with said thimble-shaped interior surface upon either said primary end or said secondary end of said leverage bar being inserted through said bore.

5. The multipurpose wrench tool of claim 4, wherein either said primary end or said secondary end further includes a standard screwdriver head integrally-formed therein.

6. The multipurpose wrench tool of claim 5, wherein said second end of said shaft member further includes a standard male socket adaptor integrally-formed therein.

7. A multipurpose wrench tool, comprising:

(a) an elongated shaft member having both a first end and a second end, said first end including an integrally-formed standard lug nut socket, said shaft member further having an enlarged middle section located at an approximate midpoint along said shaft member, said middle section including a transversely positioned cylindrical bore formed therethrough, said bore having a tapering diameter and a thimble-shaped interior surface; and (b) an elongated leverage bar insertable into said bore of said shaft member, said leverage bar including a thimble-shaped section located at an approximate midpoint on said leverage bar integrally-formed as part of said bar, said bar having a substantially uniform and non-tapering diameter on each side of said thimble-shaped section, said thimble-shaped section having a slope similar to the slope of said thimble-shaped interior surface of said bore such that said thimble-shaped section is wedged into engaging position with said thimble-shaped interior surface upon said leverage bar being inserted into said bore.

8. The multipurpose wrench tool of claim 7, wherein one end of said bar further includes a standard screwdriver head integrally-formed therein.

9. The multipurpose wrench tool of claim 8, wherein a second end of said bar further includes a standard male socket adaptor integrally-formed therein.

* * * * *